(12) United States Patent
Danzyger et al.

(10) Patent No.: US 6,390,423 B1
(45) Date of Patent: *May 21, 2002

(54) ERGONOMIC SOFT-FEEL MOUSE

(75) Inventors: Howard L. Danzyger, Aurora; Heidi Jessup, Chicago; Chris Jones, Oak Lawn, all of IL (US)

(73) Assignee: Fellowes, Inc., Itasca, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,457

(22) Filed: Dec. 4, 1998

(51) Int. Cl.[7] .................................................. B68G 5/00
(52) U.S. Cl. .................. 248/118; 248/118.1; 248/118.5; 345/163
(58) Field of Search .............................. 248/118, 118.1, 248/118.5, 918; 273/148 B; 345/163, 155, 156, 157, 160, 162, 164, 165; 400/715; 341/20, 21; 361/380, 381; 200/5 R

(56) References Cited

U.S. PATENT DOCUMENTS

| | | |
|---|---|---|
| 3,676,387 A | 7/1972 | Lindlof |
| 3,676,388 A | 7/1972 | Davie |
| 4,346,205 A | 8/1982 | Hiles |
| 4,368,284 A | 1/1983 | Tawada et al. |
| 4,476,258 A | 10/1984 | Hiles |
| D287,725 S | 1/1987 | Yoshihama ................ D14/107 |
| 4,722,946 A | 2/1988 | Hostettler |
| D300,324 S | 3/1989 | Akagi et al. ................ D14/114 |
| 4,862,165 A | 8/1989 | Gart ............................ 341/20 |
| D303,662 S | 9/1989 | Hsiao et al. ................ D14/114 |
| D310,521 S | 9/1990 | Leung ........................ D14/114 |
| 4,963,858 A | 10/1990 | Chien ........................ 340/710 |
| 4,973,176 A | 11/1990 | Dietrich ...................... 400/715 |
| 4,980,386 A | 12/1990 | Tiao et al. |
| 5,045,842 A | 9/1991 | Galvin ........................ 340/709 |
| 5,046,739 A | 9/1991 | Reichow ................. 273/148 B |
| D326,261 S | 5/1992 | Ashmun et al. ............ D14/114 |
| D328,892 S | 8/1992 | Miller ........................ D14/114 |
| D331,045 S | 11/1992 | Moerke ...................... D14/114 |
| D331,229 S | 11/1992 | Pike ........................... D14/114 |
| 5,165,630 A | 11/1992 | Connor ..................... 248/118.1 |
| D331,575 S | 12/1992 | Pike ........................... D14/114 |
| 5,203,845 A | 4/1993 | Moore ......................... 248/118 |
| 5,252,970 A | 10/1993 | Baronowsky ................ 341/20 |
| 5,280,276 A | 1/1994 | Kwok ......................... 345/167 |
| 5,287,089 A | 2/1994 | Parsons ...................... 345/156 |
| 5,298,919 A | 3/1994 | Chang ........................ 345/163 |
| 5,313,229 A | 5/1994 | Gilligan et al. ............. 345/157 |
| 5,336,708 A | 8/1994 | Chen .......................... 524/474 |
| 5,340,067 A | 8/1994 | Martin et al. ............. 248/118.5 |
| 5,355,148 A | 10/1994 | Anderson ................... 345/166 |
| 5,400,054 A | 3/1995 | Dorst .......................... 345/167 |
| 5,473,344 A | 12/1995 | Bacon et al. ............... 345/163 |
| 5,473,345 A | 12/1995 | Dorst .......................... 345/167 |
| 5,501,458 A | 3/1996 | Mallory ................. 273/148 B |
| D370,219 S | 5/1996 | Blumer et al. ............. D14/114 |
| 5,530,455 A | 6/1996 | Gillick et al. ............... 345/163 |
| 5,563,631 A | 10/1996 | Masunaga ................... 345/169 |
| 5,570,112 A | 10/1996 | Robinson ................... 345/163 |
| 5,576,733 A | 11/1996 | Lo ............................. 345/163 |
| D376,790 S | 12/1996 | Goulet et al. .............. D14/100 |

(List continued on next page.)

*Primary Examiner*—Anita King
*Assistant Examiner*—Gwendolyn Baxter
(74) *Attorney, Agent, or Firm*—Brinks Hofer Gilson & Lione

(57) ABSTRACT

A new ergonomic soft feel mouse is provided. The soft feel mouse includes a palm rest that is softer and squishier than palm rests of other mouses. The palm rest includes a gel layer that provides the soft and squishy feel. The gel layer can be formed using a liquid gel that is molded. The palm rest may also include a foam layer and/or a film layer.

8 Claims, 2 Drawing Sheets

U.S. PATENT DOCUMENTS

| | | | |
|---|---|---|---|
| 5,581,277 A | 12/1996 | Tajiri | 345/163 |
| 5,633,286 A | 5/1997 | Chen | |
| D380,210 S | 6/1997 | Allana et al. | D14/114 |
| D381,013 S | 7/1997 | Allana et al. | D14/114 |
| 5,648,798 A | 7/1997 | Hamling | 345/163 |
| 5,657,051 A | 8/1997 | Liao | 345/163 |
| 5,659,335 A | 8/1997 | Partridge, III | 345/157 |
| D387,749 S | 12/1997 | Diaz | D14/114 |
| 5,706,031 A | 1/1998 | Brendzel et al. | 345/172 |
| 5,712,725 A | 1/1998 | Faltermeier et al. | 359/392 |
| 5,713,544 A | 2/1998 | Wolf et al. | |
| 5,717,610 A | 2/1998 | Baba | 364/558 |
| D392,959 S | 3/1998 | Edwards | D14/114 |
| 5,731,807 A | 3/1998 | Feierbach | 345/163 |
| 5,760,117 A | 6/1998 | Chen | 524/270 |
| 5,771,038 A | 6/1998 | Wang | 345/163 |
| 5,826,841 A * | 10/1998 | Lavore | 248/118 |
| 5,868,365 A * | 2/1999 | Hesley | 248/118 |
| 5,884,879 A * | 3/1999 | Gruenenfelder | 248/118 |
| 5,894,302 A * | 4/1999 | Scenna et al. | 345/163 |
| 5,949,406 A * | 9/1999 | Kress | 345/163 |
| 6,016,138 A * | 1/2000 | Harskamp et al. | 345/163 |
| 6,039,292 A * | 3/2000 | Danzyger et al. | 248/118.5 |
| 6,050,964 A * | 4/2000 | Yates | 248/118 X |
| 6,195,085 B1 | 2/2001 | Becker et al. | |

* cited by examiner

ERGONOMIC SOFT-FEEL MOUSE

BACKGROUND OF THE INVENTION

Computer mouses are well known in the computer accessory industry. Indeed, there have been many different mouse designs disclosed in industry literature and in the marketplace. One goal of the industry has been to make a mouse that is comfortable for the user. Thus, several ergonomic-type mouses have been designed. For example, there have been mouses that are designed in the shape of the user's hand, mouses that are designed to support both the wrist and the palm, and mouses that have foam pads to make them softer. However, there has never been a mouse that uses a gel layer for supporting the user's palm. A gel is visco-elastic solid exhibiting the properties of both a spring and a dampener. It is illustrated mechanically by connecting the symbol for a spring with that of a dashpot.

When utilized as a filler material, the gel provides cushion, comfort, support, and protection (attenuation of shock and vibration) in a manner different than traditional fillers.

Foam, for example, provides support by compression. A cellular material, the foam is mostly air or entrapped generation gas having relatively low density. The common polyurethane, highly resilient foam is an open cell structure. There are any number of rubber, neoprene, butyl, vinyl nitrile and EPDM foams that are closed cell, with blowing gas (typically $CO_2$) entrapped and providing additional suspension for the structure. Compressing foam deforms the cell walls and movers (in the case of open cell foam) or compresses (in the case of closed cell foam) entrapped gas.

Fiber fillers provide loft and cushioning by the natural resilience of their fibrous structures and the entrapment of air. The effect is similar to the compression of foam.

Gel is unique. A solid gel cannot be compressed. What provides the feeling of softness is elasticity, i.e., very low modulus. Gel provides support by displacement. Based upon the physical properties of the gel, the initial pressure required to begin displacement can be very low, with a progressive resistance that increases with the application of additional pressure. In that way gel can provide comfort while resisting compression or bottoming in ways that foams cannot.

When you overcome the elasticity of the gel material, you move it. This is an advantage in that as the gel is displaced, the contact area increases, helping to maintain low contact pressure.

Another advantage of gel is that it imitates the feel of natural tissue. The hydraulic softness of the gel emulates contact with something living, making gel feel comfortable and "friendly". Other advantages are:

Gel provides support by displacement as opposed to compression. Increasing contact area assures comfort as pressure is increased.

The low modulus of gel makes it a superior shock and vibration dampening material.

Polyurethane is highly crosslinked, making polyurethane gel a good progressive cushion, that resists bottoming.

Gel has "tissue like" appeal, making it a preferred feel.

Thus, gel layers make a much softer, more comfortable palm rest than foams or other materials known and used in the prior art.

BRIEF SUMMARY OF THE INVENTION

It is a principal objective of the present invention to provide an ergonomic mouse having a gel layer for supporting the user's palm.

It is a further objective of the present invention to provide an ergonomic mouse having a gel layer that has a soft feel that is softer, compressible and has more flex than prior art mouses.

It is a further objective of the present invention to provide an ergonomic mouse having a gel layer that was formed from a liquid gel.

It is a further objective of the present invention to provide an ergonomic mouse having an elastomerse layer that was formed using injection molding.

These and other features and advantages of the present invention will be further understood upon consideration of the following detailed description of the invention.

DETAILED DESCRIPTION OF THE INVENTION

Figure 1:
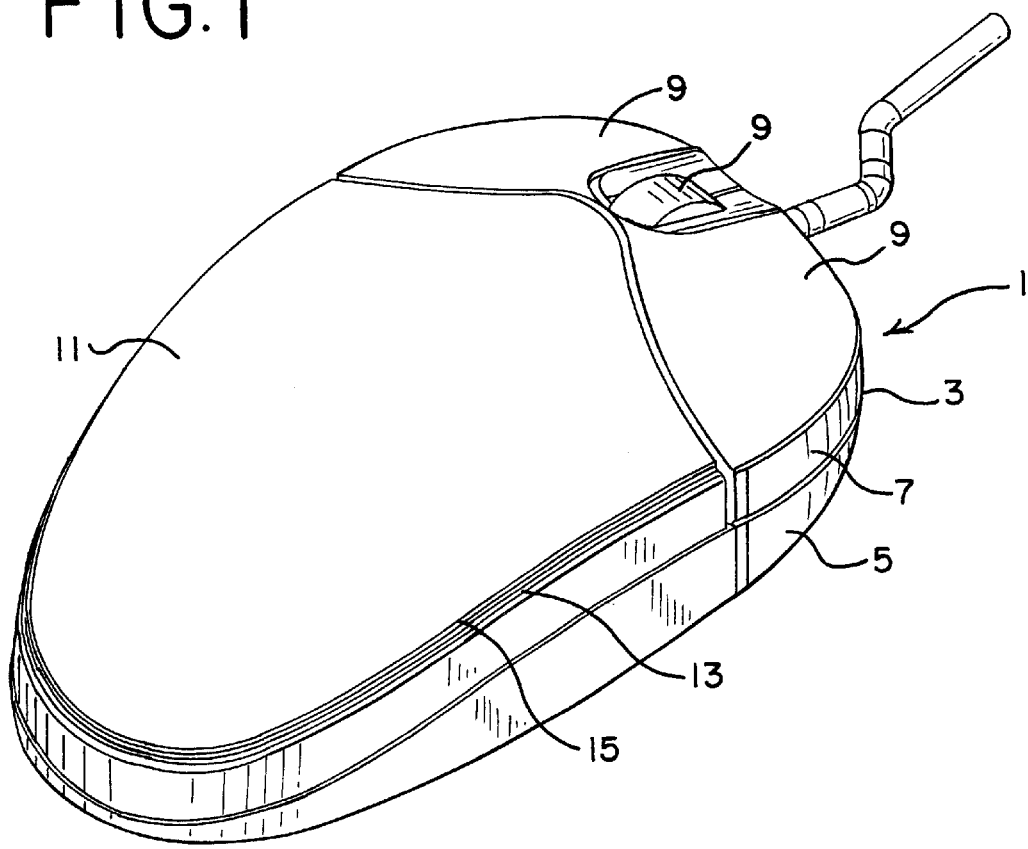
FIG. 1 shows an ergonomic mouse having a gel palm rest.

FIG. 1 shows an embodiment of the present invention. The ergonomic mouse (1) shown in FIG. 1 includes a housing (3). The housing (3) is made of a hard plastic. The housing (3) includes a mouse bottom (5) and a mouse top (7). The mouse bottom (5) and the mouse top (7) can be a single integral piece or two separate pieces assembled together to form a single housing (3). Preferably, the mouse bottom (5) and top (7) comprise two pieces. The housing (3) also includes one or more mouse keys (9).

On top of the mouse top (7) is a palm rest (11). Preferably, the palm rest (11) includes a gel layer (13) with a film layer (15) on top of it. The gel layer gives the palm rest (11) a soft feel. The soft feel is often associated with a very soft and compressible feeling that yields easily to pressure and weight.

There are many different gels that can be used for the present invention. The gel may include water-based gels, stable elastomeric block polymer gels, urethane, and any other suitable gels. Examples of suitable elastomeric block polymer gels can be found in U.S. Pat. Nos. 3,676,387, 4,369,284, 5,633,286 and 5,713,544, and the relevant disclosures of each are incorporated herein by reference. Examples of polyurethane gels include those in U.S. Pat. Nos. 4,346,205, 4,476,258, 4,722,946 and 4,980,386, and the relevant disclosures of each are incorporated herein by reference.

The present invention can be made using gels that come in liquid form. In such an embodiment, a mold is used to form the palm rest. The mold is in the shape of the palm rest (11). In processing the palm rest (11), a film is first placed in the mold. The liquid gel is then poured into the mold on top of the film and allowed to cure. During the curing process, the gel adheres to the film. After the gel has cured, it is removed from the mold along with the film. The gel and film are now in the shape of the palm rest (11). The palm rest (11) is then attached to the mouse top (7) in a way so that the gel layer (13) is adjacent the mouse top (7) and the film layer (15) is on the top side of the palm rest (11). In this manner, when the soft feel mouse is in use, the user's palm will be in contact with the film layer (15) of the palm rest (11).

Figure 2A:
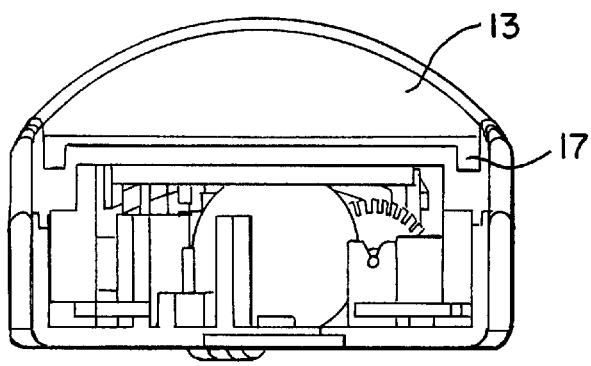
FIGS. 2a and 2b shows an ergonomic mouse having a palm rest that includes a foam and gel layer.
Figure 2B:
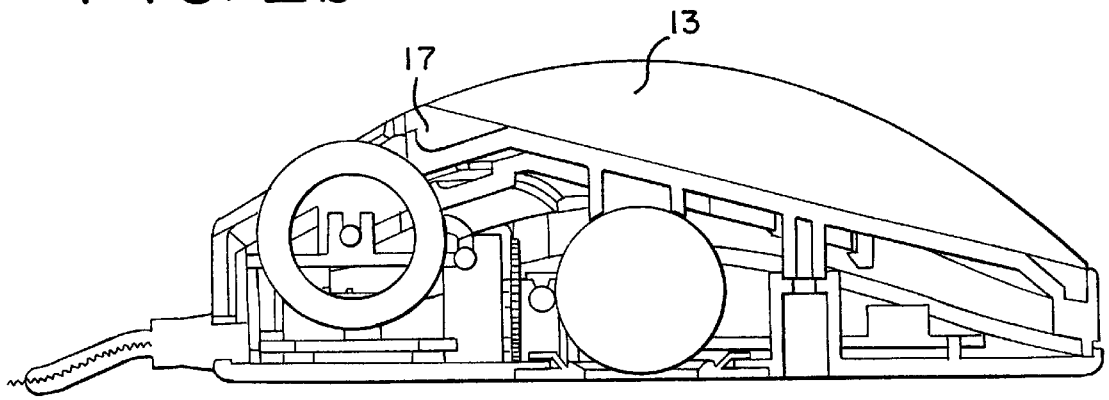

In another embodiment using a liquid gel, as seen in FIGS. 2a and 2b, the palm rest (11) includes a foam layer

(17) below a gel layer (13) such that the foam layer (17) is in contact with the mouse top (7). A mold is also used to produce the palm rest (11) of this embodiment. In processing this palm rest (11), a film is first placed in the mold. The liquid gel is then poured into the mold on top of the film and allowed to cure. During the curing process, the gel adheres to the film. At this stage, the film layer (15) and the gel layer (13) have been formed. After the gel has cured, foam is placed (usually by spraying or pouring) onto the gel. The mold is then closed and the foam expands forming a foam layer (17). The foam layer (17) and the gel layer (13) adhere together. The foam, gel and film are now in the shape of the palm rest (11). After the palm rest (11) is formed, it is removed from the mold and attached to the mouse top (7). The palm rest (11) is often attached to the mouse top (7) using an adhesive such as glue. The palm rest (11) is attached to the mouse top (7) in a way so that the foam layer (17) is adjacent the mouse top (7) and the film layer (15) is on the topside of the palm rest (11). In this manner, when the soft feel mouse is in use, the user's palm will be in contact with the film layer (15) of the palm rest (11).

The thickness of the film layer (15), gel layer (13) and foam layer (17) are a matter of design choice and can vary from one mouse design to another. In the mouse shown in FIGS. 2a and 2b, the thickness of the film layer (15) preferably is in the range of 0.002"–0.010". The thickness of the gel layer (13) varies with the contour of the mouse from approximately 0.00"–0.50". Likewise, the thickness of the foam layer (17) also varies with the contour of the mouse from approximately 0.0"–0.250".

Figure 3:
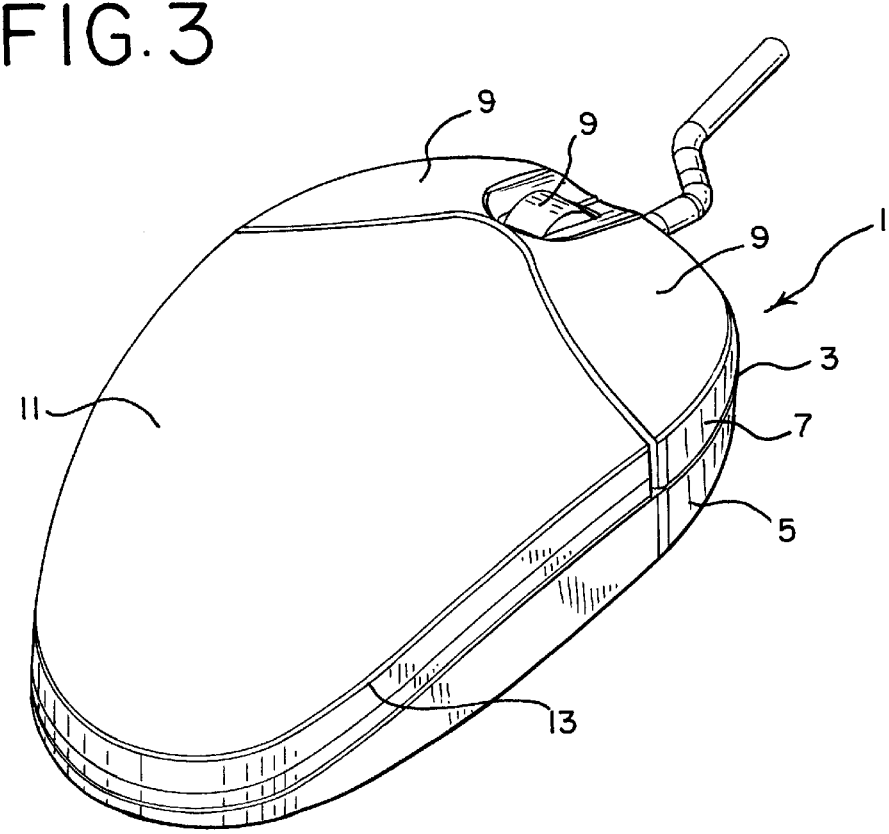
FIG. 3 shows an ergonomic mouse having a gel palm rest that was formed by injection molding.

In yet another embodiment of the soft feel mouse, as seen in FIG. 3, the palm rest (11) is formed by an injection molding process. In particular, a soft durometer plastic or thermoplastic elastomer (TPE) is injected into the mouse top (7) of the housing (3) to form the palm rest (11). When injection molding is used, the elastomer often comes in pellet form. It is heated to liquid form and then injected into the housing (3) using an injection-molding machine. The TPE is then cured to form a TPE layer (13) that constitutes the palm rest (11). The palm rest (11) in this embodiment has a somewhat tacky, no-slip feel to it. This embodiment may also include a film layer; however, it is preferable not to do so.

The foregoing detailed description has been given for clearness of understanding only, and no unnecessary limitations should be understood therefrom, as modifications will be obvious to those skilled in the art.

What is claimed is:

1. A soft feel, ergonomic mouse for a computer comprising:

a housing having a mouse bottom and a mouse top;

at least one mouse key attached to said housing; and a palm rest attached to said mouse top wherein said palm rest comprises a gel layer, said gel layer having a recovery time that is less than two seconds.

2. The soft feel, ergonomic mouse of claim 1 wherein said palm rest further comprises a film layer above said gel layer.

3. The soft feel, ergonomic mouse of claim 1 wherein said palm rest further comprises a foam layer below said gel layer.

4. The soft feel, ergonomic mouse of claim 1 wherein said palm rest is not removable from said mouse.

5. A soft feel, ergonomic mouse for a computer comprising:

a housing having a mouse bottom and a mouse top;

at least one mouse key attached to said housing; and a palm rest attached to said mouse top wherein said palm rest comprises an elastomeric layer, said elastomeric layer having a recovery time that is less than two seconds.

6. The soft feel, ergonomic mouse of claim 5 wherein said elastomeric layer has a tacky feel.

7. The soft feel, ergonomic mouse of claim 5 wherein said palm rest is not removable from said mouse.

8. The soft feel, ergonomic mouse of claim 7 wherein said elastomeric layer has a tacky feel.

* * * * *